United States Patent
Wünning et al.

(10) Patent No.: US 8,475,161 B2
(45) Date of Patent: Jul. 2, 2013

(54) REGENERATOR BURNER

(75) Inventors: Joachim A. Wünning, Leonberg (DE); Joachim G. Wünning, Leonberg (DE)

(73) Assignee: WS-Wärmeprozesstechnik GmbH, Renningen (DE)

(*) Notice: Subject to any disclaimer, the term of this patent is extended or adjusted under 35 U.S.C. 154(b) by 910 days.

(21) Appl. No.: 12/590,237

(22) Filed: Nov. 4, 2009

(65) Prior Publication Data

US 2010/0119983 A1    May 13, 2010

(30) Foreign Application Priority Data

Nov. 7, 2008    (EP) ..................... 08168633

(51) Int. Cl.
*F23D 14/66*    (2006.01)
*F24C 3/00*    (2006.01)

(52) U.S. Cl.
USPC ............. 431/11; 431/215; 431/167; 431/166; 431/348

(58) Field of Classification Search
USPC ............... 431/11, 215, 166, 167, 348
See application file for complete search history.

(56) References Cited

U.S. PATENT DOCUMENTS

| | | | | |
|---|---|---|---|---|
| 5,326,255 | A * | 7/1994 | Wunning | 431/215 |
| 6,033,208 | A * | 3/2000 | Wunning | 431/215 |
| 6,036,476 | A | 3/2000 | Mitani et al. | |
| 6,293,275 | B1 * | 9/2001 | Wunning | 126/91 A |
| 6,430,925 | B2 * | 8/2002 | Heikrodt | 60/515 |
| 6,488,076 | B1 | 12/2002 | Yasuda et al. | |
| 6,880,619 | B1 | 4/2005 | Suzukawa et al. | |
| 7,029,271 | B2 * | 4/2006 | Wunning et al. | 431/215 |

FOREIGN PATENT DOCUMENTS

DE    44 20 477    12/1995

* cited by examiner

*Primary Examiner* — Steven B McAllister
*Assistant Examiner* — Nikhil Mashruwala
(74) *Attorney, Agent, or Firm* — Klaus J. Bach

(57) ABSTRACT

In a high efficiency regenerator burner for heating spaces, the exhaust gas generated by the burner is provided which is conducted alternately through different regenerator cartridges and a partial stream of the exhaust gas is conducted under the control of an orifice plate through a bypass space in which the regenerator cartridges are disposed. A control structure is disposed in a burner head for controlling the exhaust gas bypass flow volume and also to control the main exhaust gas flow as well as the combustion air flow through the regenerator cartridges.

12 Claims, 3 Drawing Sheets

REGENERATOR BURNER

BACKGROUND OF THE INVENTION

The present invention relates to a burner for heating furnaces, in particular closed furnace chambers, or for heating interior spaces of jet pipes by flameless oxidation (FLOX®).

For preheating the combustion air of burners either recuperators or regenerators are used. Recuperators are heat exchangers that utilize exhaust gas heat for preheating combustion air, whereby heat of the hot exhaust gas is transferred through a dividing wall to the combustion air. In contrast, regenerators are heat storage devices through which alternately exhaust gas and combustion air is conducted whereby the storage device heat up in one phase and, as a result, the exhaust gas is cooled. In order to transfer the absorbed heat to the combustion air, the combustion is subsequently conducted through hot storage device in another phase. Regenerator technology offers a higher degree of heat recovery with a given construction volume, however, also requires considerable expense and effort for the periodic switching from exhaust gas mode to fresh air mode. In the past, regenerator burners were preferably used with relatively high efficiency. They are also increasingly in demand for burners with medium efficiency ranges.

DE 44 20 477 A1 discloses industrial burners with regenerative air preheating. Such an industrial burner is suitable for the medium power range of 50 to 300 kW. It comprises regenerative cartridges which are located in the furnace wall, so that the temperature of the exhaust gas is already reduced in the furnace wall. Nozzles are arranged on the hot side of the regenerator cartridges, said nozzles discharging the preheated air at a high speed. As a result of this, a strong exhaust gas recirculation is produced in the furnace. The thusly effected flameless oxidation (FLOX® principle) is particularly suitable when the air is preheated to high temperatures in order to avoid the thermal $NO_x$ formation and to improve the uniformity of temperature in the furnace. Switching valves for switching the individual regenerator cartridges from heat absorption to heat release are located on the burner head.

For many years, such burners have been successfully used for the direct heating of furnaces. With a furnace temperature of e.g., 1100° C., it is possible to preheat the combustion air to 950° C. When natural gas is used as fuel, this provides for a combustion efficiency of 85%. However, the exhaust gas is not always completely discharged via the regenerators. A certain partial stream is directed into other regions such as, for example, a preheating zone of a flow-through furnace in order to preheat the material that is to be treated.

It has also been known to heat furnace spaces indirectly by the use of jet pipes. A jet pipe encloses an interior space that is heated by a burner whereby the jet pipe is heated to a temperature that is high enough to heat the furnace space using the radiation heat emitted by the jet pipe. Considering these jet pipes, the $NO_x$ problem becomes prevalent because the temperature inside the jet pipe is higher than in the furnace. In addition, the recirculation required for maintaining the flameless oxidation is impaired because of the limited open flow cross-section. However, in order to still achieve the desired recirculation and flameless oxidation, the pulse rate of the air should be increased at the output nozzles which direct the stream of combustion air into the interior of the jet pipe.

As a rule, jet pipes are operated at an internal pressure that approximately corresponds to the external pressure. Therefore, the partial exhaust gas stream that is to be taken from the jet pipe is removed by an exhaust gas blower drawing the gas through the regenerator arrangement. Due to the flow resistance of the regenerators, and due to the high flow resistance of the air nozzles on account of the high flow rate, and due to the resultant pressure gradient, the exhaust gas blower must overcome a high pressure difference. The loss of pressure in the burner thus increases with the square of the flow rate in the air nozzles.

It is the principle object of the present invention to overcome the mentioned technical problems with the application of flameless oxidation for heating closed or enclosed spaces. In particular, the blower power requirements should be as low as possible and the heating efficiency should be as high as possible.

SUMMARY OF THE INVENTION

In a high efficiency regenerator burner for heating spaces, the exhaust gas generated by the burner is provided which is conducted alternately through different regenerator cartridges and a partial stream of the exhaust gas is conducted under the control of an orifice plate through a bypass space in which the regenerator cartridges are disposed. A control structure is disposed in a burner head for controlling the exhaust gas bypass flow volume and also to control the main exhaust gas flow as well as the combustion air flow through the regenerator cartridges.

A FLOX burner is used for heating closed or enclosed spaces, in connection with a heat regenerator arrangement in which alternately heat is absorbed from an exhaust gas flow and thereafter combustion air is conducted through the regenerators in order to transfer the absorbed heat to the combustion air while the regenerators are cooled again. The regenerator arrangement comprises at least one bypass channel, by means of which a partial exhaust gas stream—bypassing the regenerator channels—can be conducted out of the combustion chamber in which heat is generated by flameless oxidation of fuel, and conducted to an exhaust gas draft arrangement.

Thus, the bypass channel substantially contributes to the reduction of the pressure losses in the burner such that the power consumption of the exhaust gas draft blower can be substantially reduced. Consequently, the operating costs of the burner are lowered. For example, a reduction of the energy consumption of the exhaust gas draft blower by approximately 35% is possible.

In the simplest case, the bypass channel can direct a portion of the exhaust gas stream—thermally unused—to the exhaust gas draft blower. This alone results in a reduction of the exhaust gas blower power output requirement. Preferably, however, the exhaust gas stream conducted in the bypass channel is thermally utilized. In a first embodiment, the exhaust gas stream conducted through the bypass channel flows around the outer surfaces of the regenerator cartridges. Consequently, the generator cartridges are in a hot environment that is an environment that has been heated by exhaust gases. This increases the already high combustion efficiency that can be achieved with the regenerators.

Additionally, or alternatively, it is possible to use a heat exchanger, for example a counter-current heat exchanger (which is also referred to as a recuperator) to thermally utilize, fully or in part, the partial exhaust gas stream conducted through the bypass channel. With the use of such a recuperator, it is also possible for example to preheat the stream of fuel gas or also a part of the combustion air. The preheating of gas makes sense, in particular, when so-called weak gases, i.e.—gases having a low heat value but a high volume flow, are injected into the combustion space. Considering such combustion gases exhibiting a low heat value such as, for example, blast furnace gas or miscellaneous residual gases, the ratio of the volume flows of exhaust gas and air increases up to a value of 2. In this case, it may be useful to make the bypass stream relatively large, e.g., larger than 20% of the total stream of exhaust gas drawn out by the draft blower, and to utilize the recuperator specifically for fuel gas preheating.

Additionally or alternatively, as already mentioned, it is also possible to heat part of the combustion air stream via the regenerators and another part of the combustion air stream via the recuperator which, in turn, is heated by the exhaust gas bypass stream. Parallel thereto, the exhaust gas bypass stream may flow around the outside of the regenerators.

Combustion gases having a high heat value, e.g. propane, natural gas or coke oven gas, are supplied to the burner, preferably without being preheated. The bypass stream, which is then used exclusively for preheating air, should be approximately 20% of the total exhaust gas flow. The bypass stream may be adjusted by installing a suitable bypass orifice plate in order to provide for optimal conditions. In so doing, the suction draft for the exhaust gas is considerably reduced with virtually no additional expense and effort and, at the same time, the exterior jackets of the regenerators are utilized for a recuperative heat recovery from the partial exhaust gas stream.

Details of advantageous embodiments of the invention will become more readily apparent from the following description of the invention on the basis of the accompanying drawings.

DESCRIPTION OF ADVANTAGEOUS
EMBODIMENTS OF THE INVENTION

Figure 1:
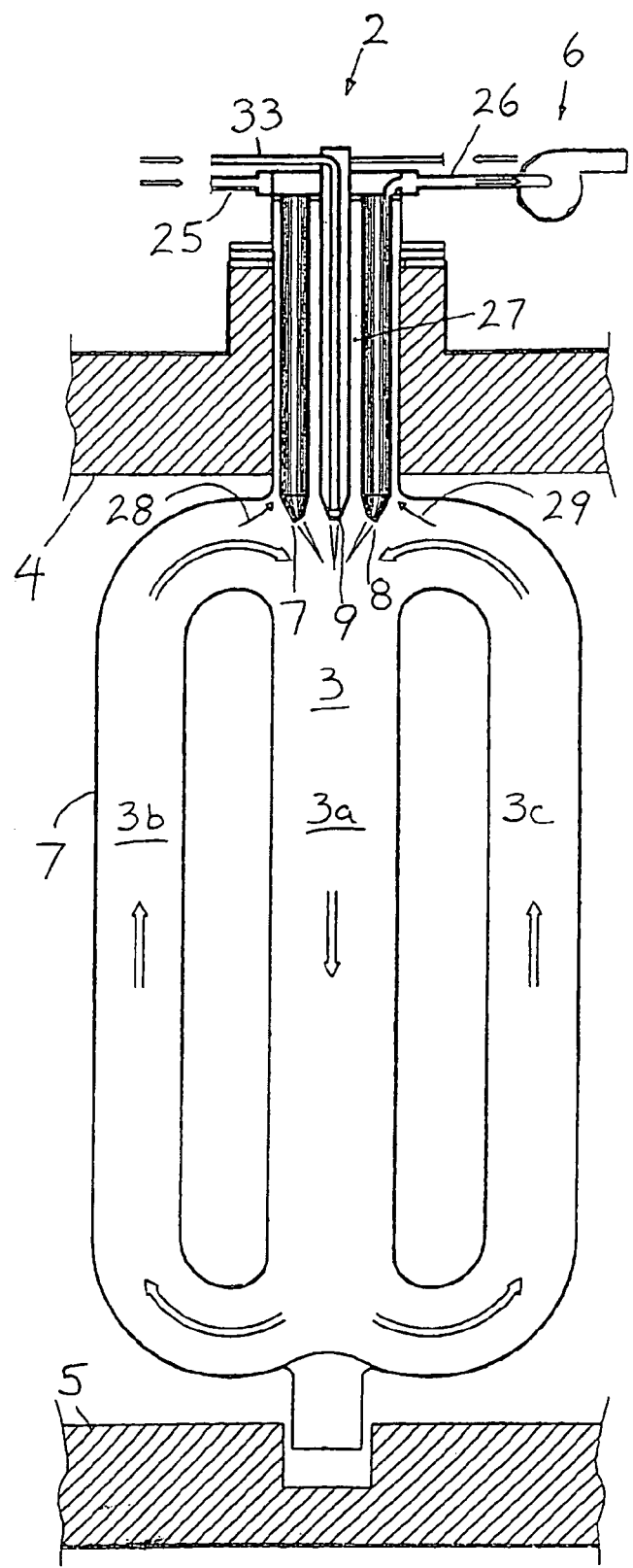
FIG. 1 is a schematic representation, shown partially in section, of a furnace space with a jet pipe for heating the regenerator burner which is installed in said furnace space.

FIG. 1 shows a regenerator burner 2 that is used for heating a jet pipe 1. The jet pipe 1 consists for example of steel or of a ceramic material. It encloses an interior space 3 with a central pipe section 3a and one, two or more elongated pipe sections 3b, 3c which extend parallel to the central pipe section 3a and are in communication therewith at the opposite ends of the central pipe section 3a to form combustion gas combustion flow circuits. The jet pipe 1 is closed at one end. The regenerator burner 2 is arranged at the opposite end. It is provided for the supply of air and fuel to the jet pipe as well as for the removal of exhaust gas from the jet pipe 1.

The jet pipe 1 is arranged between two furnace walls 4, 5 and is adapted to heat the furnace space enclosed by the furnace walls 4, 5 by the radiation of heat thereto. As a rule, the temperature prevailing in the interior space of the jet pipe 3 is substantially above the temperature prevailing in the furnace space.

The regenerator burner 2 establishes a strong circulating flow in the pipe sections 3a, 3b, 3c as indicated by the arrows, in that said regenerator burner blows or injects preheated combustion air and fuel centrally into the pipe section 3a of the interior space at a high gas discharge speed. A part of the re-circulating exhaust gas is sucked out by way of the regenerator burner 2. This is accomplished with an exhaust gas draft blower 6.

The regenerator burner 2 is mounted in the furnace wall 4. It comprises air nozzles 7, 8 and at least one fuel nozzle 9. The preheated combustion air exits the air nozzles 7, 8 at a high output speed. At least at the air nozzles 7 and 8 of the interior space 3 the combustion air inlet speed is preferably over 100 m/sec; preferably a speed of at least 150 m/sec is provided. Due to the high flow speed, on the one hand, and due to the high proportion of re-circulating exhaust gas in the resultant gas mixture, a flameless oxidation occurs in which case the fuel injected into the pipe section 3a is not oxidized locally as it is ejected from the fuel nozzle 9 but oxidation is distributed over a large region of the jet pipe 3, and thus the heat generated by the oxidation of the fuel is released uniformly whereby oxidation occurs with very low $NO_x$ generation.

Figure 2:
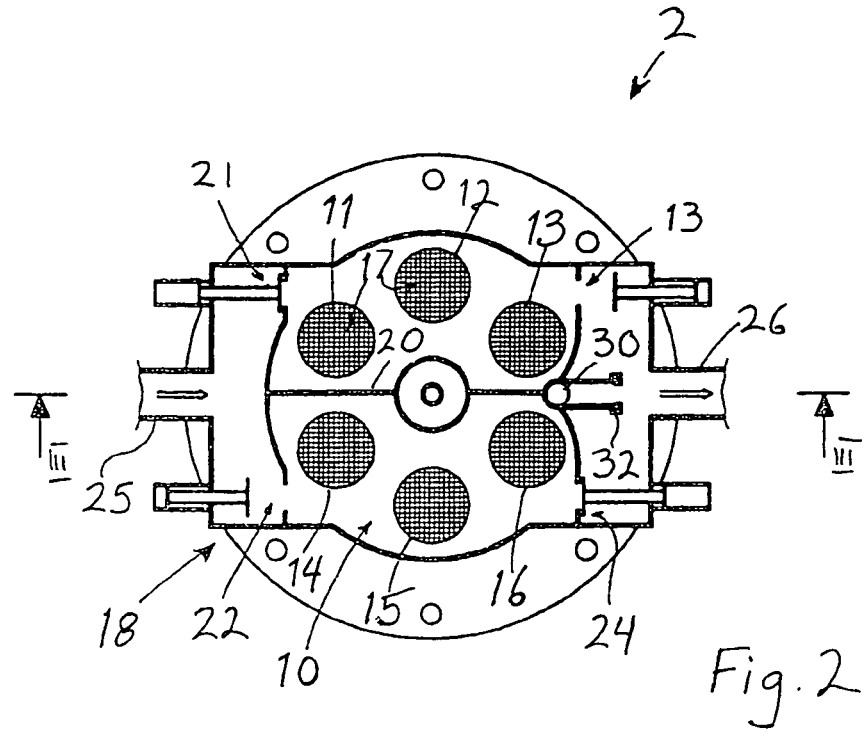
FIG. 2 is a vertical sectional view of the regenerator in accordance with FIG. 1.
Figure 3:
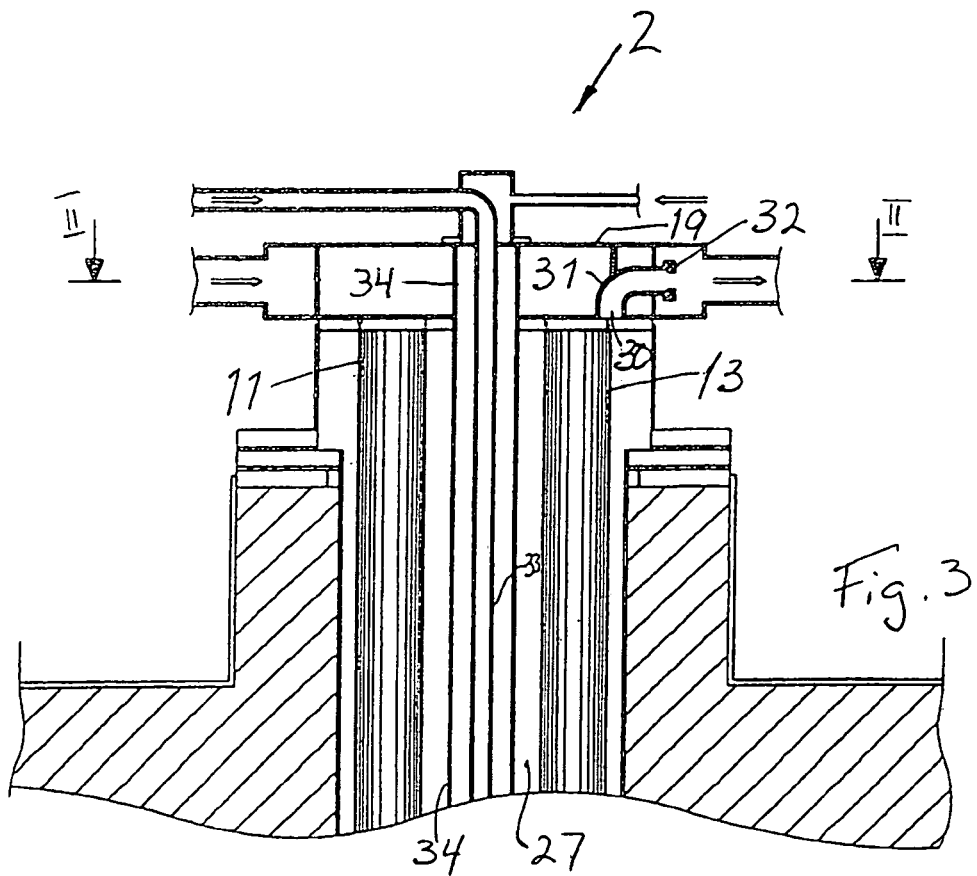
FIG. 3 is a longitudinal sectional view of a detail of the regenerator burner in accordance with FIG. 2.

The regenerator burner 2 is more clearly illustrated in FIGS. 2 and 3. It consists of a regenerator unit 10 that comprises several regenerators 11, 12, 13, 14, 15 and 16. They are configured, for example, as cartridges having a cylindrical exterior jacket. On their inside, they have a plurality of branched channels 17 that act as regenerator channels and through which the exhaust gas to be cooled and the combustion air to be heated are alternately conducted.

The six regenerators 11 to 16 present in the exemplary embodiment are divided into at least two groups that alternately take up heat and discharge heat (each group may comprise any number of regenerators). The switching of the regenerators is effected by a control unit 18. It comprises a flat, closed housing 19, from the bottom of which the regenerators 11 to 16 extend parallel to each other and arranged in a circular array around the center line of the burner. The housing 19 comprises a dividing wall 20 that divides the interior space into two chambers. The regenerators 11, 12, 13 form a first group disposed in communication with one of these chambers, while the regenerators 14, 15, 16 form a second group disposed in communication with the other chamber. Each of the chambers is provided with an inlet valve 21, 22 and an outlet valve 23, 24 respectively. The inlet valves 21, 22 are arranged in communication with a combustion air channel 25. The outlet valves 23, 24 are arranged in communication with an exhaust gas channel 26. The valves 21 to 24 have associated therewith valve drives which are not specifically shown in FIG. 2, but which may be for example electric motor drives, magnetic drives, hydraulic drives, pneumatic drives or the like. They are adapted to actuate the valves 21 through 24 in such a manner that the regenerator groups are alternately in communication with the combustion air channel 25 and the exhaust gas channel 26. The latter leads to the exhaust gas draft blower 6.

The regenerators 11 to 16 are arranged in a volume 27, through which a partial exhaust gas stream flows. In FIG. 1, it is symbolized by small arrows 28, 29. An opening 30 in the bottom of the housing 19 leads, e.g. via a pipe 31 to an orifice plate 32 that acts as the throttle for the adjustment of the exhaust gas stream volume. The orifice plate 32 may be configured so as to be interchangeable. It terminates in a space of the housing 19, to which the exhaust gas channel 26 is connected.

In addition, the regenerator burner 2 comprises a central gas supply pipe 33 that terminates at the fuel nozzle 9 (FIG. 1). The gas supply pipe 33 may be enclosed by an air supply pipe 34 that is provided for supplying air to the burner when the burner is ignited and is then inactive or conducts only a small flow of combustion air.

The regenerator burner 2 described so far is suitable, in particular, for gases having a high heat value. The regenerator burner operates as follows:

During operation, the exhaust gas draft blower 6 generates a suction draft, by way of which the exhaust gas is drawn from the jet pipe 3.

Referring to the valve position in accordance with FIG. 2, the exhaust gas flows through the regenerators 11, 12 and 13, as well as through the bypass channel which is formed by the volume 27. The partial exhaust gas stream of the bypass channel that is limited by the orifice plate 32 accounts for approximately 20% of the total exhaust gas flow. Fresh air is conducted through the previously heated regenerators 14, 15, 16 whereby the fresh air is heated and then discharged into the jet pipe 3 through the combustion air nozzles 7, 8. The hot combustion air jets from the combustion air nozzles 7, 8 mix with the exhaust gas that is circulated through the jet pipe 3 and with the fuel discharged from the fuel nozzle 9. The fuel is then oxidized along the section 3a and, optionally, also in the sections 3b, 3c. Exhaust gas is removed via half of the regenerators 11 to 16 which are heated thereby.

A partial exhaust gas stream flowing through the bypass channel 27 transfers its heat to the exterior surfaces of the regenerators 11 to 16. As a result of this measure, on one hand, the suction draft for the exhaust gas is considerably reduced without additional expense and effort while, on the other hand, at the same time the exterior jacket of the regenerators 11 through 16 is utilized for a recuperative heat recovery.

One implemented exemplary embodiment of such a regenerator burner 2 in a jet pipe 3 comprising a total of six regenerator cartridges 11 through 16 arranged in groups of three, has a connected wattage of 140 kW natural gas, for example. In order to achieve a $NO_x$ value of less than 50 ppm, considering an exhaust gas input temperature of 1000° C. and a preheating value of approximately 900° C., an air speed of 150 m/sec is provided at the air nozzles 7, 8 for generating a strong recirculation flow. Inside the jet pipe 3, an atmospheric pressure is maintained. Therefore, the flow resistance of the regenerator with the nozzle in exhaust gas mode is overcome by a relatively low-power exhaust gas draft blower. The following measured results are obtained:

|  | Exhaust gas bypass | |
| --- | --- | --- |
|  | no bypass | 20% bypass |
| Exhaust gas input in the nozzle | 1000° C. | 1000° C. |
| Exhaust gas at the burner outlet | 300° C. | 260° C. |
| Air preheating | 840° C. | 890° C. |
| Heat recovery | 50 kW | 53 kW |
| Firing efficiency | 86% | 88% |
| Pressure loss, exhaust gas side | 120 mbar | 80 mbar |
| Exhaust blower, consumption | 1800 W | 1200 W |
| $NO_x$ in exhaust gas | 30 ppm | 30 ppm |

It has been found that the heat recovery with the bypass is greater by approximately 5% than without the use of a bypass. In addition, the energy consumption of the exhaust gas draft blower is reduced by approximately 35%. Such an increase in the firing efficiency in the percentage range can be achieved with other means with only considerable expense and effort, whereas with the exhaust gas bypass arrangement according to the present invention virtually no additional expenses incur.

Figure 4:
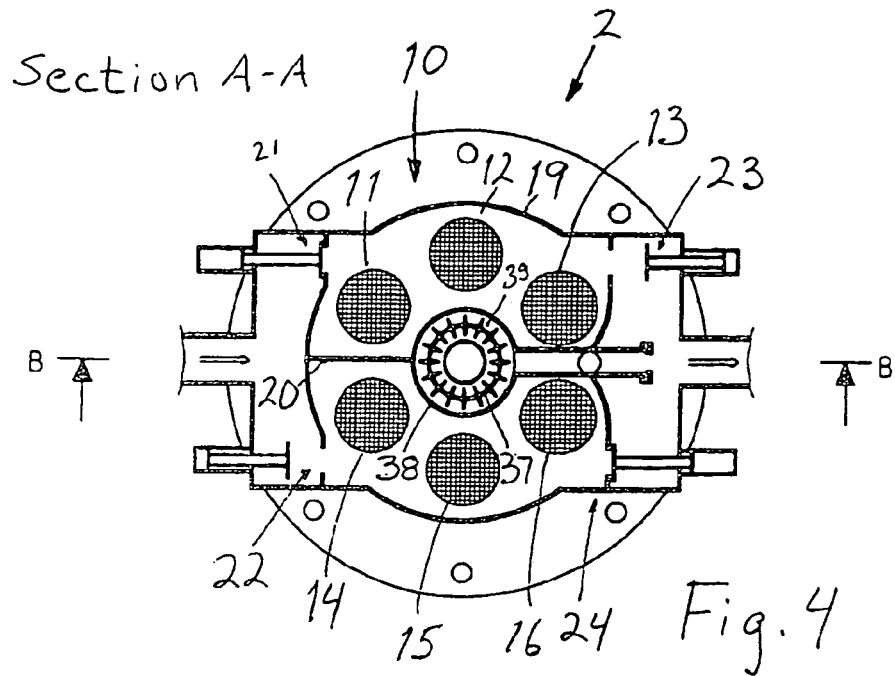
FIG. 4 is a schematic cross-sectional view of a modified embodiment of the regenerator burner.
Figure 5:
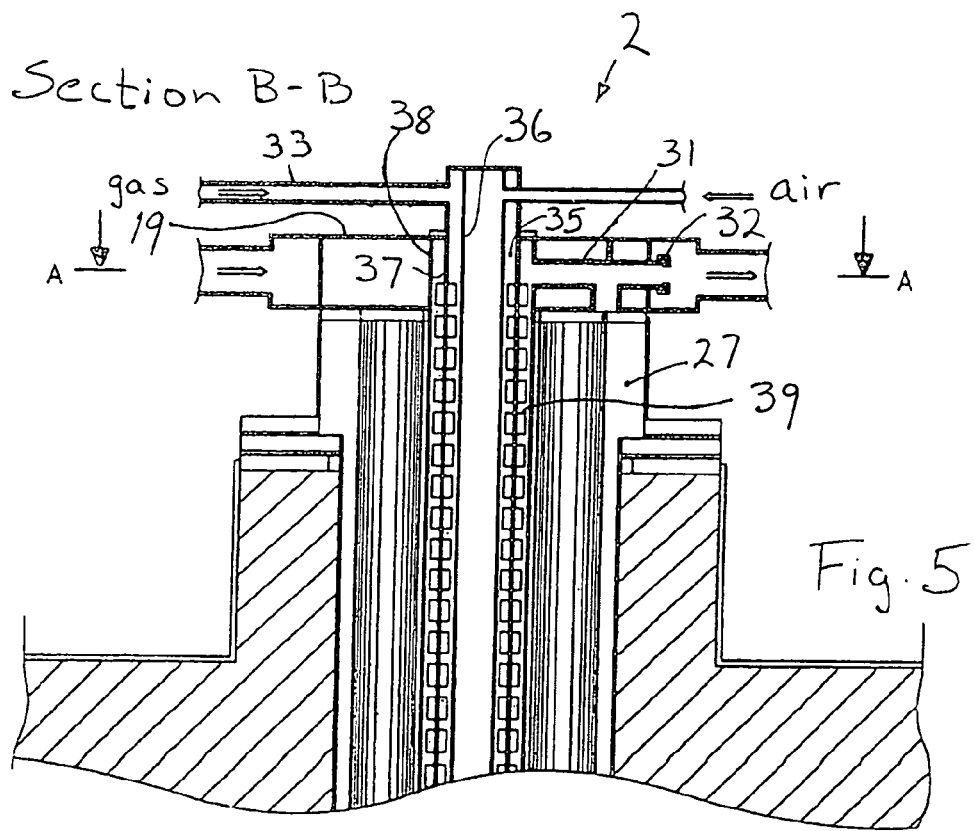
FIG. 5 is a longitudinal sectional view of a detail of the regenerator burner in accordance with FIG. 4.

FIGS. 1 through 3 show an exemplary embodiment, wherein preheating of the fuel does not take place at all or not to a substantial extent. However, it is possible to recuperatively preheat the fuel stream. This is practical, in particular with fuels, in particular gases, which have a low heat value. FIGS. 4 and 5 show a burner that is configured to this end. This burner is provided with a bypass channel 39 which is utilized fully or partially for recuperative fuel gas preheating. A gas supply channel 35 is used for the gas supply, said gas supply channel being provided between the exterior jacket of a central air supply pipe 36, that is used for start-up but is otherwise preferably inactive, and the inside of a recuperator pipe 37. The inside and the outside of the recuperator pipe may be provided with projections, fins or the like in order to improve the heat transfer. A partial gas stream flows around the exterior jacket of the recuperator pipe 37. To do so, the recuperator pipe 37 may be arranged in an additional pipe 38. The exhaust gas channel 39 created between the recuperator pipe 37 and the additional exterior pipe 38 forms a bypass in which an exhaust gas stream is conducted past the regenerators 11 through 16. The channel 39 may represent the only bypass. However, preferably additionally a part of the exhaust gas is conducted past the regenerators 11 and 16 through the volume 27, in order to allow hot exhaust gas to flow around the regenerators 11 through 16 in contact with their exterior jackets. To accomplish this, as shown in FIG. 5, the pipe 31 may be branched in order for the exhaust gas to flow from the channel 39, on the one hand, and the exhaust gas from the volume 27, on the other hand. Again, the orifice plate 32 is provided for controlling the size of the partial exhaust gas stream.

The description of the regenerator burner 2 in accordance with FIGS. 1 through 3 also applies analogously, using the same reference numerals, to the regenerator burner 2 in accordance with FIGS. 4 and 5.

In order to improve the efficiency of a regenerator burner for heating jet pipes or similarly enclosed tight spaces, a partial stream of the exhaust gas is conducted via the exterior jackets of the regenerator cartridges 11 to 16 and through a pipe 31 with a bypass orifice plate 32 arranged in the burner head. With fuel gases such as propane, natural gas, coke-oven gas having a high heat value, the partial stream should be approximately 20%. The bypass orifice plate can be exchanged in order to provide for optimal conditions. Consequently, without virtually any additional expense and effort, the required suction draft for the exhaust gas is considerably reduced and, at the same time, the exterior jacket of the regenerators 11 to 16 is utilized for a recuperative heat recovery.

| | Reference Signs: |
| --- | --- |
| 1 | Jet pipe |
| 2 | Regenerator burner |
| 3 | Interior space |
| 3 a-c | Sections |
| 4, 5 | Furnace walls |
| 6 | Exhaust gas evacuation blower |
| 7, 8 | Air jets |
| 9 | Fuel jet |
| 10 | Regenerator arrangement |
| 11-16 | Regenerators |
| 17 | Channels |
| 18 | Control unit |
| 19 | Housing |
| 20 | Dividing wall |
| 21, 22 | Inlet valve |
| 23, 24 | Outlet valve |
| 25 | Combustion air channel |
| 26 | Exhaust gas channel |
| 27 | Volume/bypass channel |

-continued

| Reference Signs: | |
|---|---|
| 28, 29 | Arrows |
| 30 | Opening |
| 31 | Pipe |
| 32 | Orifice plate |
| 33 | Gas supply pipe |
| 34 | Air supply pipe |
| 35 | Gas supply channel |
| 36 | Air supply channel |
| 37 | Recuperator pipe |
| 38 | Pipe |
| 39 | Channel |

What is claimed is:

1. A burner for heating spaces (3), in particular enclosed furnace spaces or interiors of jet pipes (1), comprising:
a regenerator arrangement (10) including regenerators (11-16) for regenerative exhaust gas heat recovery and for heating combustion air utilizing exhaust gas heat, each of said regenerators comprising a regenerator channel (17) through which alternately an exhaust gas stream and a combustion air stream is established,
a fuel supply channel (33) with a nozzle (9) for supplying fuel to the spaces (3),
at least one combustion air nozzle (7, 8) in communication with the regenerator arrangement (10) for conducting heated combustion air into the spaces (3) for oxidation therein of the fuel, and
an exhaust gas exit channel (27) for conducting a partial exhaust gas stream—bypassing the regenerator channel (17)—out of the space (3) to an exhaust gas discharge device (6), the regenerators (11-16) being arranged in the exhaust gas exit channel (27) so that the partial exhaust gas stream, while bypassing the regenerator channels (17), is in contact with the exterior surfaces of the regenerators (11-16).

2. The burner according to claim 1, wherein the regenerators (11-16) are cylindrical regenerator cartridges.

3. The burner according to claim 1, wherein the regenerator arrangement (10) comprises a switch-over control structure (21-24) with which the regenerators (11-16) can be switched, individually or in groups, into the exhaust gas flow for heat take-up or into the combustion air flow for heat release.

4. The burner according to claim 3, wherein the regenerators (11-16) are arranged in first and second exhaust gas exit channels (27), such that exhaust gas flows alternately around the regenerators in one and the other of the exit channels (11-16) while the combustion air is directed through the generators in the other or the one of the exhaust gas exit channels for taking up heat previously transferred to the regenerators from the exhaust gas.

5. The burner according to claim 1, wherein the exhaust gas exit channel (27) is provided with a throttle device (32).

6. The burner according to claim 5, wherein the throttle device (32) is an exchangeable orifice plate.

7. The burner according to claim 1, wherein the air nozzle (7, 8) is designed so as to generate a stream of combustion air at an output rate sufficient for suppressing flame formation.

8. The burner according to claim 1, wherein the speed of the fuel gas exiting the fuel nozzle (9) is at least 80 m/sec.

9. The burner in accordance with claim 1, wherein the burner comprises at least one fuel channel (33) that extends through the burner to a fuel nozzle (9).

10. The burner in accordance with claim 9, wherein the fuel channel (33) extends through an air supply channel (34).

11. The burner according to claim 1, wherein a fuel channel (35) is in heat exchange with an exhaust gas flow channel (38) extending around the fuel channel (35).

12. The burner according to claim 11, wherein the fuel supply channel (35) is disposed within a recuperator pipe (37) forming a counter-current heat exchanger arrangement.

\* \* \* \* \*